United States Patent
Kubo

(10) Patent No.: US 9,080,846 B2
(45) Date of Patent: Jul. 14, 2015

(54) SHAPE MEASURING APPARATUS

(71) Applicant: Panasonic Corporation, Osaka (JP)

(72) Inventor: Keishi Kubo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 90 days.

(21) Appl. No.: 14/022,655

(22) Filed: Sep. 10, 2013

(65) Prior Publication Data

US 2014/0068958 A1   Mar. 13, 2014

(30) Foreign Application Priority Data

Sep. 12, 2012 (JP) ................................. 2012-200788

(51) Int. Cl.
  *G01B 5/004* (2006.01)
  *G01B 5/016* (2006.01)
  *G01B 5/00* (2006.01)

(52) U.S. Cl.
  CPC .............. *G01B 5/016* (2013.01); *G01B 5/0004* (2013.01)

(58) Field of Classification Search
  CPC .............................. G01B 5/016; G01B 5/0004
  USPC ............................................ 33/503, 556, 559
  See application file for complete search history.

(56) References Cited

U.S. PATENT DOCUMENTS

| | | | | |
|---|---|---|---|---|
| 4,777,818 A * | 10/1988 | McMurtry | | 33/503 |
| 5,260,580 A | 11/1993 | Itoh et al. | | |
| 5,291,662 A * | 3/1994 | Matsumiya et al. | | 33/503 |
| 5,621,978 A * | 4/1997 | Sarauer | | 33/503 |
| 5,684,856 A | 11/1997 | Itoh et al. | | |
| 6,002,465 A | 12/1999 | Korenaga | | |
| 6,072,183 A | 6/2000 | Itoh et al. | | |
| 2001/0045526 A1 | 11/2001 | Itoh et al. | | |
| 2003/0037451 A1* | 2/2003 | Sarauer | | 33/503 |
| 2005/0172505 A1* | 8/2005 | Trull et al. | | 33/503 |
| 2011/0314686 A1* | 12/2011 | Noda | | 33/556 |
| 2013/0047452 A1* | 2/2013 | Mcmurtry et al. | | 33/503 |
| 2013/0283627 A1* | 10/2013 | Noda et al. | | 33/503 |
| 2014/0068958 A1* | 3/2014 | Kubo | | 33/559 |
| 2014/0317941 A1* | 10/2014 | Patti et al. | | 33/503 |

FOREIGN PATENT DOCUMENTS

| | | |
|---|---|---|
| DE | 43 12 255 | 10/1994 |
| JP | 5-77126 | 3/1993 |

OTHER PUBLICATIONS

European Search Report (ESR) issued Nov. 25, 2013 in European Patent Application No. EP 13 18 3307.

* cited by examiner

*Primary Examiner* — G. Bradley Bennett
(74) *Attorney, Agent, or Firm* — Wenderoth, Lind & Ponack L.L.P.

(57) ABSTRACT

There are provided a first (Y-axial direction) moving unit, a movement auxiliary unit for moving in substantially parallel with the first moving unit, and a second (X-axial direction) moving unit for moving substantially perpendicular to the first moving unit. Force generated for moving the second moving unit is received by the movement auxiliary unit to perform driving of the XY directions. Thus, when a measuring probe provided on the second moving unit is scanned in the XY directions, vibrations of the first moving unit can be suppressed without the first moving unit receiving a counter-action of force that acts in a direction substantially perpendicular to the moving direction of the first moving unit.

4 Claims, 9 Drawing Sheets

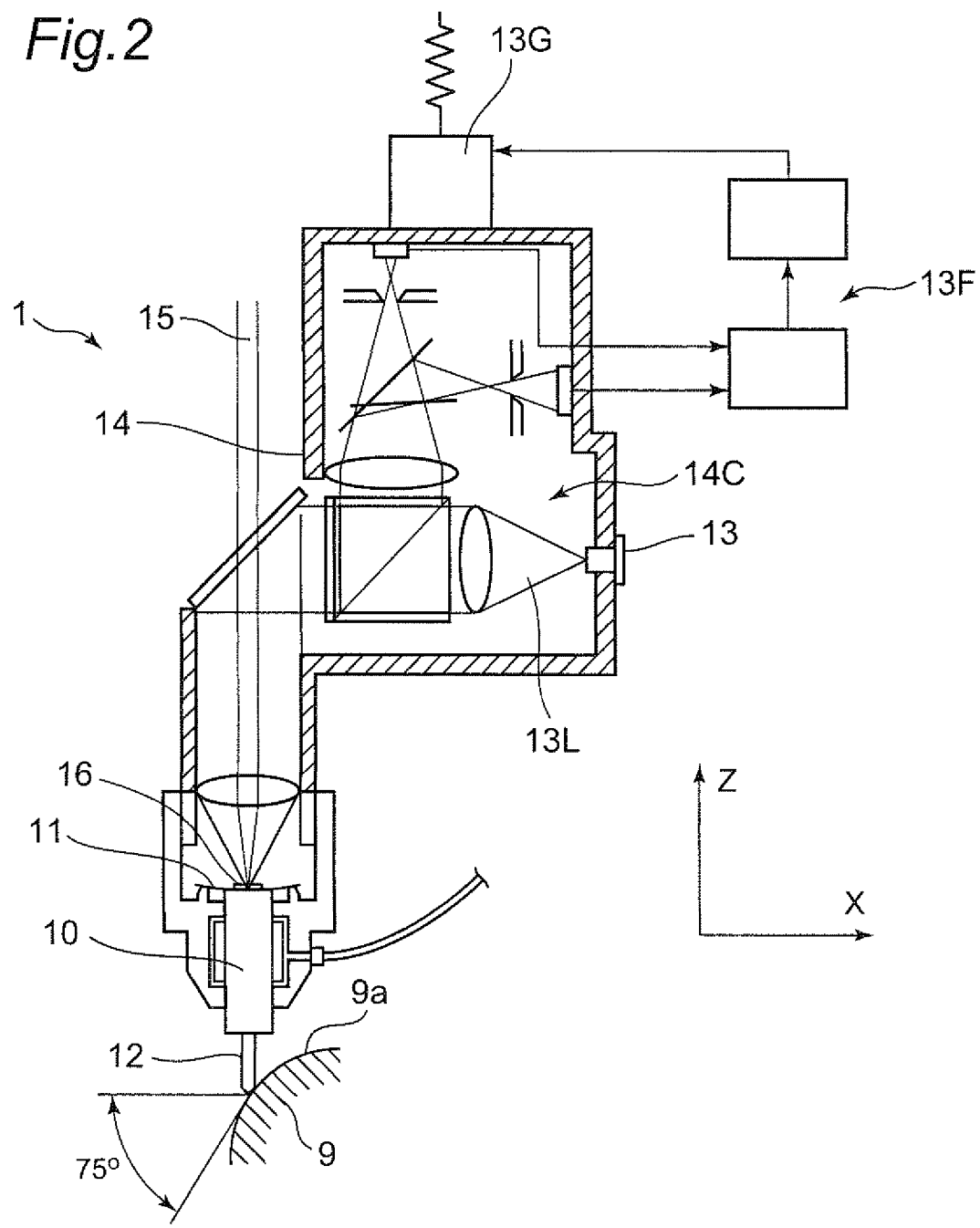

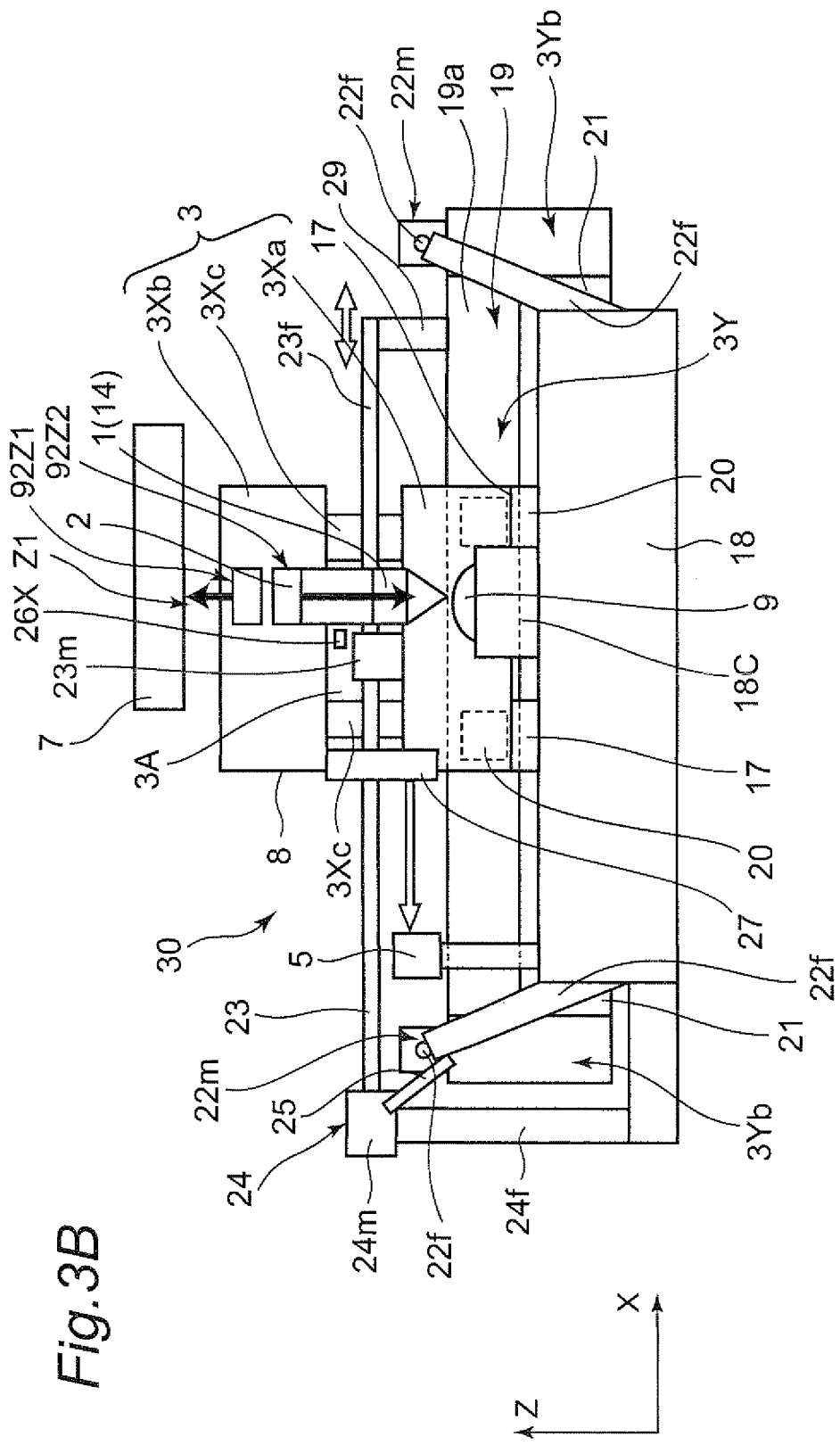

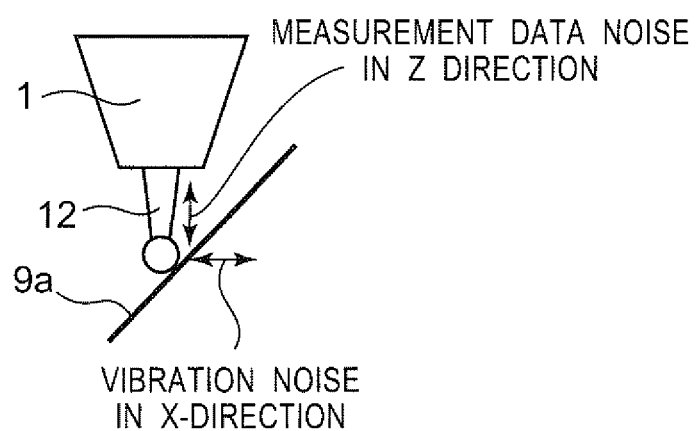

SHAPE MEASURING APPARATUS

BACKGROUND OF THE INVENTION

The present invention relates to a shape measuring apparatus for measuring a shape by use of a probe or the like, wherein a probe that specifies the surface in XY-axis directions or a measured object is moved in the XY-axis directions on a stage, and a shape of the measured object is measured by the probe.

With the recent advancement of the optical electronics technology, demands are increasing for improvement in picture quality in cameras such as digital cameras and mobile devices using cameras such as smartphones. Especially, demands are increasing for high-accuracy lenses which are finished with an error of 0.1 μm (100 nm) or less with respect to designed shapes, as surface shapes of lenses for use in the cameras. Among those, also in a shape measuring apparatus which performs high-accuracy measurement, demands are further increasing for high accuracy due to reduction in noise at the time of measurement. Above all, in the shape measuring apparatus where a probe is scanned to measure a shape, it has been required to reduce vibration noise at the time of scanning measurement, and performance of an XY stage has a higher proportion of an effect in reducing vibrations at the time of scanning.

Among stage structures for use in conventional shape measuring apparatuses and the like, there is a stage structure where a portion at the end of a linear motor which receives driving force of the linear motor is supported by another support member different from a movable section and a fixed section of the stage, to prevent the whole stage from receiving a counteraction of force at the time of driving the stage, thus reducing vibrations generated in the shape measuring apparatus (Japanese Unexamined Patent Publication No. 5-77126).

FIGS. 8A and 8B show a conventional stage structure described in Japanese Unexamined Patent Publication No. 5-77126.

In FIGS. 8A and 8B, numeral 101 denotes a surface plate, numeral 102 denotes a movable stage, numeral 103X denotes a first X-axial linear motor, numeral 103Y denotes a first Y-axial linear motor, numeral 104X denotes a second X-axial linear motor, numeral 104Y denotes a second Y-axial linear motor, numeral 105X denotes a support plate which supports the second X-axial linear motor 104X, and numeral 105Y denotes a support plate which supports the second Y-axial linear motor 104Y. The support plates 105X, 105Y are mounted on a floor 109 different from the surface plate 101. Further, the surface plate 101 is configured such that vibrations are isolated by a vibration isolator 110. Moreover, the support plates 105X, 105Y which support the second X-axial/Y-axial linear motors 104X, 104Y are configured so as to be supported by extension of arms from the floor 109.

The movable stage 102 is supported so as to be positioned movably in XY directions by use of an air bearing or the like at a point of intersection between an X-axis yoke 106X, which moves in the Y direction and controls an X-axial moving direction, and a Y-axis yoke 106Y, which moves in the X direction and controls a Y-axial moving direction. With this configuration, the X-axis yoke 106X moves in the Y-direction by thrust of the second Y-axial linear motor 104Y, to roughly position the movable stage 102 in the Y-direction. By a similar procedure, the Y-axis yoke 106Y moves in the X-direction by thrust of the second X-axial linear motor 104X, to roughly position the movable stage 102 in the X-direction.

Here, in a guide of the X-axis yoke 106X moving in the Y-direction, a moving direction is defined by a Y-axis air bearing 107Y, and in a guide of the Y-axis yoke 106Y moving in the X-direction, a moving direction is defined by an X-axis air bearing 107X.

Further, it is configured that thrust is generated against the movable stage 102 in the X-direction and the Y-direction respectively by a coil 108X for driving in the X-direction and a coil 108Y for driving in the Y-direction to perform fine positioning, the coil 108X and the coil 108Y being respectively mounted in the X-axis yoke 106X and the Y-axis yoke 106Y.

In FIGS. 8A and 8E, a conventional example of driving the movable stage 102 in the Y-axis direction will be described hereinafter, where high-speed, rough positioning is performed by large thrust by use of the second Y-axial linear motor 104Y. At this time, the support plate 105Y of the second Y-axial linear motor 104Y is supported by extension of the arm from the floor 109. For this reason, at the time of driving the second Y-axial linear motor 104Y, counteracting force is generated on the fixed side of the second Y-axial linear motor 104Y against force generated by the X-axis yoke 106X to drive the movable stage 102. This counteracting force is not transmitted to the surface plate 101 constituting a stage unit. Hence the surface plate 101 does not generate vibrations and the like in high-speed, rough positioning with large thrust by the second Y-axial linear motor 104Y.

SUMMARY OF THE INVENTION

However, since the support plate 105Y is mounted on the floor 109 to support the fixed side of the second Y-axial linear motor 104Y in order to perform fine positioning, vibrations and the like from the floor 109 are transmitted through driving force of the second Y-axial linear motor 104Y to the X-axis yoke 106X, thereby making it impossible to perform high-accuracy positioning.

Therefore, at the time of performing fine position control, after completion of rough positioning by the second Y-axial linear motor 104Y, driving force of the second Y-axial linear motor 104Y is turned off. Subsequently, thrust is generated in a magnet portion mounted on the stage 102 by the first Y-axial linear motor 103Y arranged on the vibration isolator 110 and mounted on the Y-axis yoke 106Y, to perform high-accuracy positioning while preventing floor vibrations.

However, with this configuration, counteracting force against force generated for driving the stage 102 is generated in the Y-axis yoke 106Y which serves as a force generating source.

Here, a moving direction of a Y-axial position of the Y-axis yoke 106Y is controlled by the X-axis air bearing 107X which has favorable accuracy in control of the moving direction, but has low rigidity.

Moreover, acceleration generated by force for driving the movable stage 102 is inversely proportional to a weight of a movable portion. Accordingly, when a weight of the movable stage 102 is larger than a weight of the Y-axis yoke 106Y and driving force is constant, acceleration, which is generated by a counteraction generated in the Y-axis yoke 106Y having a smaller weight than that of the movable stage 102, is larger than acceleration which is generated by the force for driving the movable stage 102. Moreover, Y-axial control of the Y-axis yoke 106Y is supported by the X-axis air bearing 107X having low rigidity. For these reasons, vibrations with large amplitude are generated in the Y-axis yoke 106Y.

There has been a problem in that vibrations induced by the Y-axis yoke 106Y lead to propagation of harmful vibration noise through resonance or the like to a portion different from the shape measuring apparatus, to cause generation of noise harmful to measurement, thereby not allowing high-accuracy measurement.

That is, in the above conventional configuration, fine positioning driving is performed by the first linear motor 103X or 103Y, and counteracting force from the movable stage 102 is thus received in the Y-axis yoke 106Y having a smaller weight than that of the movable stage 102. Moreover, in order to control the position of the Y-axis yoke 106Y with high accuracy, it is supported by the X-axis air bearing 107X having small rigidity. For this reason, there has been a problem in that large acceleration generated in the Y-axis yoke 106Y cannot be completely received in the X-axis air bearing 107X, to generate vibrations with large amplitude, and these vibrations bring about resonance in the portion different from the apparatus, to cause generation of noise in measurement, thereby not allowing high-accuracy measurement.

The present invention is to solve the above conventional problems, and has an object to provide a shape measuring apparatus for measuring a shape by use of a probe or the like, wherein vibrations are reduced at the time of measurement as the probe or a measured object is driven and measured in XY-axis directions, to perform high-accuracy measurement.

In order to accomplish the object, according to one aspect of the present invention, there is provided a shape measuring apparatus, comprising:

a surface plate;

a first moving unit that has a first fixed section extending along a first axis direction as any one of XY-axis directions of the surface plate and coupled with the surface plate, and a first movable section backward and forward moving along the first axis direction with respect to the first fixed section, and is arranged on the surface plate;

a movement auxiliary unit that has an auxiliary unit fixed section extending along the first axis direction and coupled with the surface plate, and an auxiliary unit movable section backward and forward moving in substantially parallel with a moving direction of the first movable section with respect to the auxiliary unit fixed section; and a second moving unit that has a second fixed section which extends along a second-axis direction orthogonal to the first axis direction our of the XY-axis directions of the surface plate, and has one end movably supported by the first moving unit, and an other end fixed to the auxiliary unit movable section of the movement auxiliary unit, and a second movable section laterally moving in the second axis direction with respect to the second fixed section, wherein, the first moving unit has a first-axial drive unit having the first fixed section and the first movable section, while the second moving unit has a second axial driving unit having the second fixed section and the second movable section, and an XY-stage is configured such that the first-axial drive unit is driven to move the XY stage in the first-axis direction along with the first movable section with respect to the first fixed section, a counteraction of force generated at a time of movement of the second movable section is received in the movement auxiliary unit when the second axial drive unit is driven to move the XY stage in the second-axis direction along with the second movable section with respect to the second fixed section, one of a probe that measures a surface of a measured object and the measured object is supported by the XY stage, and the other is supported by the surface plate, and the XY stage is driven to relatively scan the probe in the XY-axis directions with respect to the surface of the measured object, to measure a shape of the measured object from information acquired by the probe.

According to an other aspect of the present invention, there is provided the shape measuring apparatus according to the above aspect, further comprising:

a coupling mechanism that makes the auxiliary unit movable section of the movement auxiliary unit synchronized and move in accordance with movement of the first movable section of the first moving unit.

According to an other aspect of the present invention, there is provided the shape measuring apparatus according to any one of the above aspects, further comprising:

a position detecting device that detects a position of the second movable section of the second moving unit with respect to the first moving unit; and a position controlling section that drive-controls the second axial drive unit based on the position of the second movable section which is detected by the position detecting device.

According to the present configuration, the measured-object measuring probe supported by the second moving unit is scanned in the XY-axis directions, thereby to allow suppression of vibrations of the first movable section at the time of driving the second movable section of the second moving unit in the moving direction of the second movable section, without the first moving unit receiving a counteraction of force that acts in a direction substantially perpendicular to the moving direction of the first movable section of the first moving unit, whereby it is possible to provide a high-accuracy shape measuring apparatus without generating excess vibration noise in the whole apparatus.

As described above, according to the shape measuring apparatus of the present invention, it is possible to reduce vibrations at the time of measurement, so as to perform high-accuracy measurement.

BRIEF DESCRIPTION OF THE DRAWINGS

These and other aspects and features of the present invention will become clear from the following description taken in conjunction with the preferred embodiments thereof with reference to the accompanying drawings, in which:

FIG. 2 is a probe constitutional view of the shape measuring apparatus in the first embodiment of the present invention;

FIG. 3B is a detailed side view of the shape measuring apparatus in the first embodiment of the present invention;

FIG. 5B is a view showing the relation of X- and Y-axial/Z-axial noises in the first embodiment of the present invention;

DETAILED DESCRIPTION OF THE PREFERRED EMBODIMENTS

Figure 1:
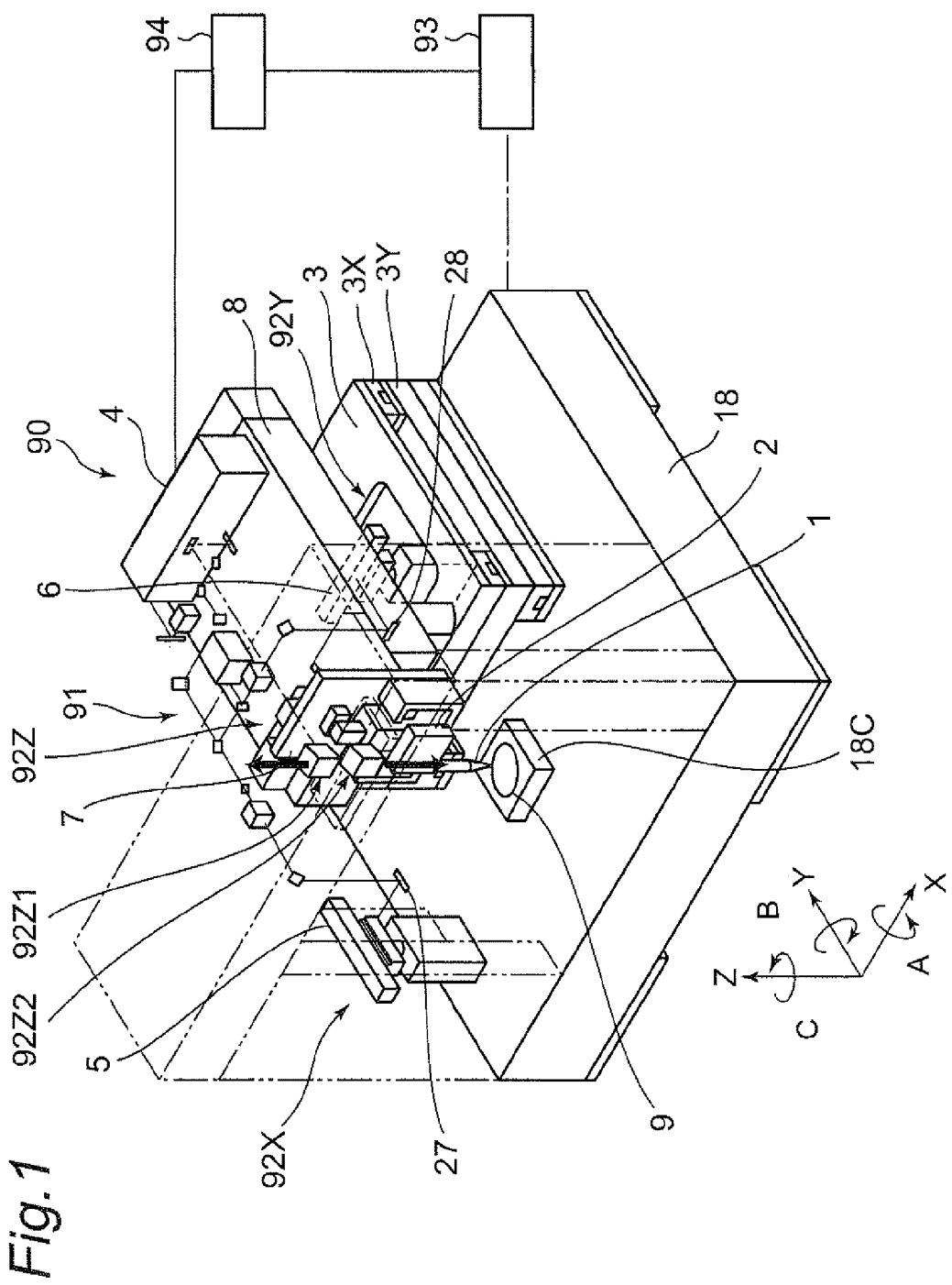
FIG. 1 is a whole constitutional view of a shape measuring apparatus in a first embodiment of the present invention.

Before the description of the present invention proceeds, it is to be noted that same parts are designated by same reference numerals throughout the accompanying drawings.

Hereinafter, embodiments of the present invention will be described with reference to the drawings.

First Embodiment

FIG. 1 shows a preferred apparatus configuration to carry out a first embodiment of the present invention.

FIG. 1 is a perspective view showing a schematic configuration of a shape measuring apparatus as an embodiment for carrying out a shape measuring method in the first embodiment of the present invention. In FIG. 1, the shape measuring apparatus 90 is configured as follows. On a lower surface plate 18 which holds a measured object 9 in a holding section 18C, an XY stage 3 is arranged movably in XY-axis directions as an example of a second axis direction and a first axis direction. An upper stone surface plate 8 is arranged on the XY stage 3, and an oscillation frequency stabilizing He—Ne laser 4 for measuring an XYZ coordinate position of the measured object is arranged on the upper stone surface plate 8. The probe 1 is attached to the upper stone surface plate 8 via a Z1-axis stage 2. The XY stage 3 is configured by a Y-axis stage 3Y arranged on the lower side and driven by a motor and an X-axis stage 3X arranged on the upper side and driven by a motor. Frequency stabilizing He—Ne laser light 15 is emitted by the oscillation frequency stabilizing He—Ne laser 4, and the emitted laser light 15 is divided into laser lights in four directions of X, Y, Z1, and Z2 axes via an optical system 91 arranged on the upper stone surface plate 8. Thereafter, each divided light is reflected to each of an X-reference mirror 5, a Y-reference mirror 6, and a Z-reference mirror 7, each being fixed to the lower stone stage 18 and having high nanometer-order flatness, and a mirror 16 of an after-mentioned probe unit 14. With such a configuration, it is possible to measure an XYZ coordinate of a measuring surface 9a of the measured object 9 with nanometer-order ultrahigh accuracy by means of an X-coordinate detection device 92X, a Y-coordinate detection device 92Y, a Z1-coordinate detection device 92Z1 for measuring a position of the Z-reference mirror 7, and a Z2 coordinate detecting device 92Z2 for detecting a Z-directional position of the probe 1. The X-coordinate detection device 92X, the Y-coordinate detection device 92Y, the Z1-coordinate detection device 92Z1, and the Z2-coordinate detecting device 92Z2 are connected with an arithmetic processing unit 93. With this configuration, arithmetic processing is performed on measurement data inputted from the X-coordinate detection device 92X, the Y-coordinate detection device 92Y, the Z1-coordinate detection devices 92Z1, and the Z2-coordinate detecting device 92Z2, to obtain three-dimensional coordinate data of the measuring surface 9a of the measured object 9, thereby performing shape measurement. Here, numeral 27 denotes an X-axial laser emitting section, and numeral 28 denotes a Y-axial laser emitting section.

A unit of these, namely the after-mentioned probe unit 14 (including a focus detecting laser 13 and the like), the Z1-axis stage 2, the XY stage 3, the oscillation frequency stabilizing He—Ne laser 4, the X-axial laser emitting section 27, the Y-axial laser emitting section 28, the X-coordinate detection device 92X, the Y-coordinate detection device 92Y, the Z1-cordinate detection device 92Z1, Z2-cordinate detection device 92Z2, and the arithmetic processing section 93, and further, respective drive units or members such as linear motors 22, 23, are operation-controlled by a control device 94 so that measurement operation is automatically performed in the shape measuring apparatus 90.

FIG. 2 shows a configuration of the probe 1 for use in this shape measuring apparatus 90. In FIG. 2, a stylus 12 is supported by a micro air slider 10. A movable portion of the micro air slider 10 is supported by a micro spring 11. Weak atomic force acts between the measured object 9 and the tip of the stylus 12. Due to this weak atomic force, deflection occurs in the micro spring 11. The mirror 16 of the micro air slider 10 is irradiated with focus detecting laser light 13L from the focus detecting laser 13 via an optical system 14C inside the probe unit 14 supported by the XY stage 3, and the irradiation of the focus detecting laser light 13L is detected by a focus detecting section 13F in the probe unit 14, thus measuring the deflection of the micro spring 11 and measuring the weak atomic force. Simultaneously with performing feedback control on the whole probe unit 14 in the Z-axis direction by use of a linear motor 13G so as to make this weak atomic force constant, the mirror 16 is irradiated with the frequency stabilizing He—Ne laser light 15 so as to measure a Z-axial displacement. In such a manner, a Z-axial position (Z-coordinate) of the probe 1 is measured by the Z2-coordinate detecting device 92Z2. In this state, the whole of this probe unit 14 is relatively scanned to the measured object 9 in the XY-axis directions by the XY stage 3, to measure a shape of the measuring surface 9a of the measured object 9. With such a configuration, a weight of the movable section of the micro air slider 10, which is the movable section to be attached with the stylus 12, can be made small. With such a configuration, it is possible to perform high-accuracy measurement with nanometer accuracy on the shape of the measuring surface 9a of the measured object 9, the surface 9a being inclined up to 75°, for example.

Here in FIG. 1, it is configured such that, with the X-axial laser emitting section 27 and the Y-axial laser emitting section 28 being separately fixed to the upper stone surface plate 8, a distance between the X-axial laser emitting section 27 and the Y-axial laser emitting section 28 is constant, and the XY distances from the X-axial laser emitting section 27 and the Y-axial laser emitting section 28 to the probe 1 remain unchanged. As thus described, the configuration is formed so as to hold the distances constant, it is possible to perform high-accuracy measurement on distances from the center of the probe to the X-reference mirror 5 and the Y-reference mirror 6 by means of the laser light 15 emitted in the X and Y-axis directions from the X-axial laser emitting section 27 and the Y-axial laser emitting section 28.

In FIG. 1, this shape measuring apparatus 90 scans the probe 1 on the surface (measured surface) 9a of a lens as an example of the measured object 9 in the XY-axis directions, to obtain XYZ-coordinate data columns on the surface 9a of the lens by means of the X-coordinate detection device 92X, the Y-coordinate detection device 92Y, the Z1-coordinate detection device 92Z1, and the Z2-coordinate detecting device 92Z2, and the Z-coordinate data column in the XY-coordinate position measured by the probe 1 is subjected to arithmetic processing by the arithmetic processing unit 93, thereby performing shape measurement of the surface 9a of the lens.

Figure 3A:
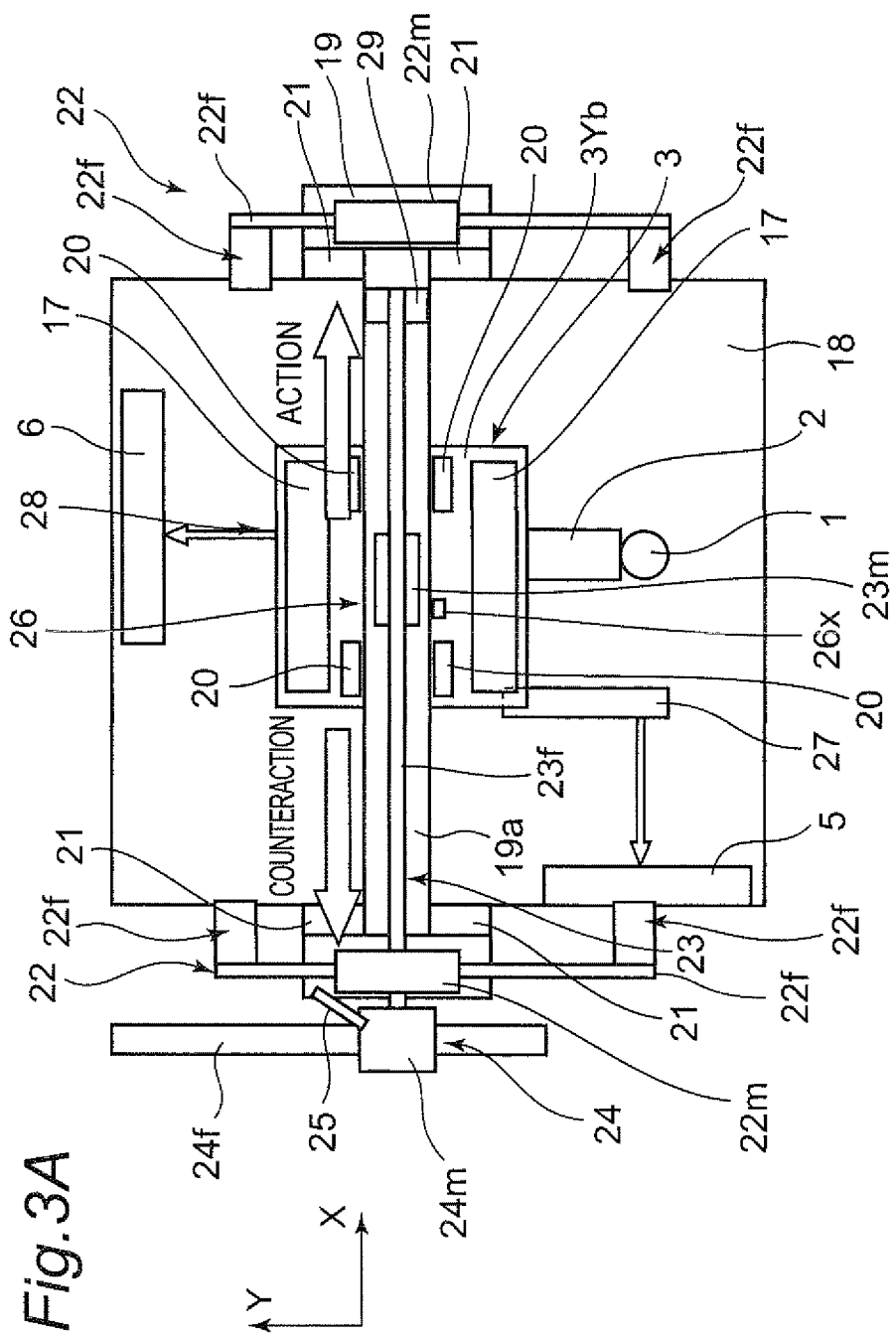
FIG. 3A is a detailed plan view of the shape measuring apparatus in the first embodiment of the present invention.

FIGS. 3A and 3B are explanatory views each showing a configuration for explaining a principle of reducing vibrations at the time of measurement and also performing high-accuracy measurement in the shape measuring apparatus 90 according to the first embodiment of the present invention.

That is, in FIGS. 3A and 3B, in the shape measuring apparatus 90, the XY stage 3 is configured by the first moving unit 19 and the second moving unit 30, and is provided with a movement auxiliary unit 24 so that the measured object 9 is measured with high accuracy by the Z-axial probe 1.

Here, a drive unit of the probe 1 is configured by the Z-axis stage (Z1-axis stage) 2 which drives the probe 1 in the Z-axis direction along with the probe unit 14, and the XY stage 3 which supports the Z-axis stage 2 and scans the probe 1 in the XY-axis directions. The XY stage 3 is supported over the lower stone stage 18 such that its weight is supported, for example, by a plurality of load-supportive air bearings 17 in the state of being non-contact with the lower stone stage 18 in a direction of gravitational force. Hence the XY stage 3 can freely move in the XY-axis directions over the lower stone stage 18 unless there is any control, but its movement is controlled in a specific direction as hereinafter described.

First, the XY stage 3 is configured by a lower-side XY-axis stage body section 3Xa, an upper-side X-axis stage body section 3Xb, and a support post 3Xc which couples the XY-axis stage body section 3Xa and the X-axis stage body section 3Xb, and a space 3S is formed by the support post 3Xc between the XY-axis stage body section 3Xa and the X-axis stage body section 3Xb.

Next, the Y-axis stage 3Y of the XY stage 3 in FIG. 1 is configured by the first moving unit 19 in FIGS. 3A and 3B.

This first moving unit 19 is configured, as one example, by the XY-axis stage body section 3Xa on the lower part of the XY stage 3, a moving unit body section 19a, and the Y-axis linear motor 22 which moves in the Y-axis direction the XY-axis stage body section 3Xa and the moving unit body section 19a. The moving unit body section 19a is a "square bracket"-shaped member movably passing through the central part of the XY-axis stage body section 3Xa in the X-axis direction. The Y-axis linear motors 22 are respectively arranged on both ends of the moving unit body section 19a.

The Y-axis linear motor 22 is configured by a first movable section 22m and a first fixed section 22f. The first movable sections 22m are respectively fixed to both ends of the moving unit body section 19a. The first fixed sections 22f at both ends of the Y-axis linear motor 22 are arranged such that the first movable section 22m is backward and forward movable and also extends along the Y-axis direction in the vicinity of both ends of the moving unit body section 19a. Both Y-axial ends of each first fixed section 22f are separately fixed and supported by the lower stone stage 18. Therefore, the first moving unit body section 19a is moved in the Y-axis direction by synchronous drive of the two Y-axis linear motors 22 arranged to the right and left of the stone stage 18.

Here, in order to control the Y-axial moving direction of the XY stage 3 and also make the XY stage 3 smoothly movable in the X-axis direction, air bearings 20 (e.g., four air bearings 20) are configured in the central portion of the XY-axis stage body section 3Xa and on at least both Y-axial ends of the moving unit body section 19a between the moving unit body section 19a of the first moving unit 19 and the XY-axis stage body section 3Xa. It is thereby configured such that Y-axial linear movement of the XY-axis stage body section 3Xa is controlled and the whole XY stage 3 is linearly moved with high accuracy only in the X-axis direction by means of the XY-axis stage body section 3Xa.

Moreover, in order to control the X-axial moving direction of the moving unit body section 19a of the first moving unit 19, it is configured such that projecting ends 3Yb projecting downward are respectively arranged at both ends of the moving unit body section 19a, and an air bearing 21 is sandwiched in the X-axis direction between the projecting end 3Yb and the lower stone stage 18. It is thereby configured such that X-axial linear movement of the moving unit body section 19a with respect to the lower stone stage 18 is controlled and the moving unit body section 19a is linearly moved with high accuracy only in the Y-axis direction.

Therefore, with the moving unit body section 19a passing through the central part of the XY-axis stage body section 3Xa and the air bearings 20 being arranged, the moving unit body section 19a and the XY-axis stage body section 3Xa integrally move in the Y-axis direction.

On the other hand, since it is configured such that the air bearings 21 are sandwiched in the X-axis direction between the lower stone stage 18 and the projecting ends 3Yb projecting downward which are respectively arranged at both ends of the moving unit body section 19a, the moving unit body section 19a does not move in the X-axis direction, and only the XY-axis stage body section 3Xa is backward and forward movable in the X-axis direction with respect to the moving unit body section 19a.

It is to be noted that with the moving unit body section 19a being sandwiched by the XY-axis stage body section 3Xa, when the moving unit body section 19a is moved in the Y-axis direction by simultaneous drive of two Y-axis linear motors 22, the whole XY stage 3 is similarly moved in the Y-axis direction by the XY-axis stage body section 3Xa.

In addition, it is configured such that the lower stone stage 18 has a larger weight than a total weight of a weight of the whole first moving unit 19 and a weight of the whole XY stage 3. As thus described, the weight of the fixed body (lower stone stage 18) to serve as a reference is made larger than that of the first moving unit 19, whereby acceleration by a counteraction received in the first fixed section 22f of each Y-axis linear motor 22 becomes smaller than that of the first moving unit 19, thus allowing realization of stable measurement.

Moreover, 3Xb as the measurement unit section of the XY stage 3 is configured as an example of the second moving unit 30 supported by three support posts (only two are shown in FIG. 3B) 3Xc on the XY-axis stage body section 3Xa.

This second moving unit 30 is configured by the XY-axis stage body section 3Xa and the X-axis linear motor 23 which moves the XY-axis stage body section 3Xa in the X-axis direction.

The X-axis linear motor 23 is configured by a second movable section 23m and a second fixed section 23f. The second movable section 23m is coupled to the XY-axis stage body section 3Xa.

The second fixed section 23f is arranged on the moving unit body section 19a so as to pass through in the X-axis direction a space 3A between the XY-axis stage body section 3Xa and the X-axis stage body section 3Xb. The above arrangement is made in order for the second movable section 23m to move in the vicinity of the gravity center of the second moving unit 30. One end of the second fixed section 23f, namely the end on the X-negative side (left side of FIGS. 3A and 3B) as one of support ends in two directions which are an X-positive direction (right direction in FIGS. 3A and 3B) of the X-axis linear motor 23 and an X-negative direction (left direction in FIGS. 3A and 3B) thereof, is supported by the movement auxiliary unit 24 arranged outside the first fixed section 22f (left side to the first fixed section 22f in FIGS. 3A and 3B). The other end of the second fixed section 23f, namely the end 29 on the X-positive side (right side of FIGS. 3A and 3B) as the other of the two support sections is supported by a rail structure or the like which is movable in the X-axis direction and does not move in YZ-axis directions with respect to the upper surface of the moving unit body section 19a of the first moving unit 19. With the second movable section 23m being coupled to the XY-axis stage body section 3Xa, the second movable section 23m laterally moves in the X-axis direction with respect to the second fixed section 23f integrally with the whole second moving unit 30 including the XY stage 3.

The movement auxiliary unit 24 is configured such that an auxiliary unit movable section 24m moves with respect to a rail-like auxiliary unit fixed section 24f extending in the Y-axis direction in substantially parallel with the first fixed section 22f of the Y-axis linear motor of the first moving unit 19. One end of the second fixed section 23f is supported by this auxiliary unit movable section 24m.

Here, in order for the auxiliary unit movable section 24m of the movement auxiliary unit 24 to be movable in the Y-axis direction and have X-axial rigidity in a substantially vertical direction to the Y-axis moving direction, the X-axial rigidity being larger than rigidity of the air bearing section 21 for controlling X-directional movement of the first moving unit 19, the auxiliary unit movable section 24m is supported by a bearing mechanism using a rolling bearing or the like with respect to the auxiliary unit fixed section 24f.

It is configured that large force is not propagated in XZ-axis directions from the moving unit body section 19a to the movement auxiliary unit 24 by means of a coupling mechanism 25, but driving force driven only in the Y-axis direction is received therein.

At this time, it is impossible to move the moving unit body section 19a of the first moving unit 19 and the movement auxiliary unit 24 by causing the respective moving directions thereof to completely parallelly coincident with each other with submicron accuracy. For this reason, in order to prevent exertion of an spring-like effect in a range of acceleration, frictional resistance, or the like by means of the coupling mechanism 25 at the time of driving the stage to the coupled portion so as to directly transmit a movement amount of the moving unit body section 19a in the Y-axis direction with submicron accuracy, the coupling mechanism 25 is configured (cf. after-mentioned configuration) to have high rigidity and release force in the X-axis direction and the Z-axis direction.

This results in that a slight XZ-axial movement shift and large force are absorbed in the moving unit body section 19a of the first moving unit 19 and the movement auxiliary unit 24, to prevent generation of excess force having an influence on the accuracy of the air bearing 20 of the moving unit body section 19a.

Further, as has already been described, the support section 29 at the X-positive directional end of the second fixed section 23f of the X-axis linear motor 23 is supported by the rail structure or the like which is movable in the X-axis direction and does not move in the YZ-axis directions with respect to the moving unit body section 19a. Hence it is configured that the X-axial driving force of the X-axis linear motor 23 with respect to the XY stage 3 is supported by the movement auxiliary unit 24.

With this configuration, an X-axial shift is generated when the moving unit body section 19a and the movement auxiliary unit 24 move in the Y-axis direction in the state of the respective moving directions thereof being not coincident. Due to this X-axial shift, an X-axial displacement is added to the support section 29 at the right end of the second movable section 23m of the X-axis linear motor 23, and due to this displacement, force is generated. The force generated as thus described can be released by the coupling mechanism 25, and hence the moving unit body section 19a can be moved with high accuracy in the Y-axis direction by means of the air bearings 21 without applying excess force in the X-axis direction of the moving unit body section 19a.

The auxiliary unit fixed section 24f of the movement auxiliary unit 24 is fixed to the lower stone stage 18 having a sufficiently large weight as compared with that of the whole XY stage 3. It is configured that force (counteracting force) in the X-negative direction (left direction in FIGS. 3A and 3B) as a reverse direction to the moving direction of the XY stage 3 is generated at the time of the XY stage 3 moving, for example, in the X-positive direction (right direction in FIGS. 3A and 3B) and thus added to the second fixed section 23f of the X-axis linear motor 23, is received in the movement auxiliary unit 24 supported by the lower surface plate 18 as a base which has a larger weight than that of the moving unit body section 19a. Moreover, it is configured such that the movement auxiliary unit 24 is provided with the bearing (rolling bearing, etc.) having higher rigidity than that of the air bearing 21 supporting the moving unit body section 19a in the X-axis direction with respect to the X-axial driving force of the linear motor.

For this reason, in the moving unit body section 19a which is movable in the Y-axis direction and required to precisely move in the Y-axis direction, the counteraction of the driving force for driving the XY stage 3 in the X-axis direction is not generated, and excess vibrations to become a noise generating source are not generated in the X-axis direction of the moving unit body section 19a.

Figure 4A:
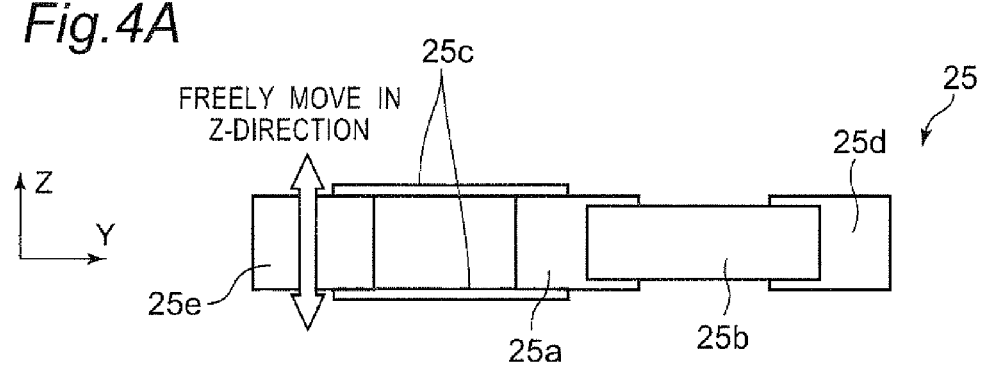
FIG. 4A is a view showing a detail of a coupling mechanism in the first embodiment of the present invention.
Figure 4B:
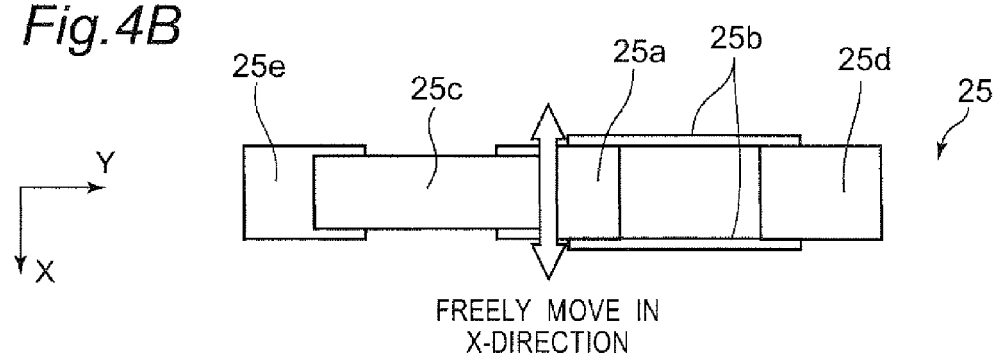
FIG. 4B is a view showing the detail of the coupling mechanism in the first embodiment of the present invention, seen from an angle different by 90 degrees from FIG. 4A.

FIGS. 4A and 4B explain a detail of the coupling mechanism 25. The coupling mechanism 25 is configured such that an intermediate member 25a in a rectangular parallelepiped shape is coupled with a first moving unit-side coupled section 25d in a rectangular shape by two first parallel plate springs 25b, and is coupled with a movement auxiliary unit-side coupled section 25e in a rectangular parallelepiped shape by two second parallel plate springs 25c which are mounted in a direction different from the two first parallel plate springs 25b by 90 degrees, for example.

The first moving unit-side coupled section 25d is coupled to the moving unit body section 19a of the first moving unit 19. The movement auxiliary unit-side coupled section 25e is coupled to the movement auxiliary unit 24. Then, the first moving unit-side coupled section 25d is coupled to the moving unit body section 19a and the movement auxiliary unit-side coupled section 25e is coupled to the movement auxiliary unit 24 such that the flat surfaces of the two first parallel plate springs 25b are orthogonal to the X-axis direction and the flat surfaces of the two second parallel plate springs 25c are orthogonal to the Z-axis direction.

As a result, the first moving unit-side coupled section 25d and the intermediate member 25a are coupled with each other in the state of being movable in the X-axis direction by means of the two first parallel plate springs 25b and having high rigidity in the Y-axis direction by means of the air bearing section 21 which controls the X-axial movement of the first moving unit 19. Further, the movement auxiliary unit-side coupled section 25e and the intermediate member 25a are coupled with each other in the state of being movable in the Z-axis direction by means of the two second parallel plate springs 25c and having high rigidity in the Y-axis direction by means of the air bearing section 21 which controls the X-axial movement of the first moving unit 19.

With such a configuration of the coupling mechanism 25, even when the Y-axial moving direction of the moving unit body section 19a and the moving direction of the movement auxiliary unit 24 are not completely in parallel with each other, if a YZ-axial void between the second movable section 23m of the X-axis linear motor 23 and the second fixed section 23f thereof is within an assembly adjustable range (e.g., acceptable rage on the order of 10 micrometers) of the X-axis linear motor 23, it is within an adjustable range of the void of the non-contact driving linear motor, whereby the moving unit body section 19a can move with high accuracy without causing damage on the X-axis linear motor 23 and applying YZ-axial excess force to the moving unit body section 19a. It should be noted that the linear motor normally has a gap (void) of close to 0.5 mm between the movable section and the fixed section in order to perform non-contact driving. Moreover, this gap also need not be perfectly constant in a full stroke of normal movement of the linear motor at the time of attachment of the linear motor, and may vary slightly (e.g., on the order of 10 μm with respect to a value of the gap). Within this slightly variable gap size, there is no mechanical interference and no influence on the movement accuracy.

Here, in order to drive-control the X-axis linear motor 23, an X-axis position detecting device 26X such as an encoder, which detects an X-axial position of the XY stage 3 with respect to the moving unit body section 19a, is mounted in the vicinity of the second movable section 23m of the X-axis linear motor 23. It is configured that by this X-axis position detecting device 26X, the X-axial position of the XY stage 3 is controlled and fed back to the X-axis linear motor 23 by use of a servo controller unit or the like as an example of a position controlling section, thereby controlling the position and movement (cf. FIG. 3A).

As thus described, it is configured that the X-axial position of the XY stage 3 is fed back to the X-axis linear motor 23 by using as a reference a signal of the X-axis position detecting device 26X such as the encoder, the X-axis position detecting device 26X being provided on the moving unit body section 19a.

At this time, vibration noise of the moving unit body section 19a to serve as a reference of the feedback needs to be suppressed to the minimum level. In the case of not being able to suppress the vibration noise to the minimum level, namely in the case of the moving unit body section 19a vibrating within the range of the gap of the air bearing 21, the moving unit body section 19a moves with respect to the lower stone stage 18 due to vibration noise or the like despite the XY stage 3 not essentially moving in the X-axis direction with respect to the lower stone stage 18, leading to vibrations of a signal detected in the X-axis position detecting device 26X such as the encoder. As a result, force is generated to move the XY stage 3 having a large weight based on the quasi-vibrating signal, thereby causing the moving unit body section 19a to vibrate. This then increases vibrations of the moving unit body section 19a.

As opposed to this, in the first embodiment of the present invention, it is configured that counteracting force which is generated at the time of driving the XY stage 3 in the X-axis direction is not received in the moving unit body section 19a, but received in the movement auxiliary unit 24. For this reason, excess vibrations are not applied to the moving unit body section 19a as well as to the X-axis position detecting device 26X such as the encoder which is mounted on the moving unit body section 19a and serves as a reference for controlling the X-axial position, and thus, excess vibrations are not generated in the X-axis direction. The feedback control is also performed in the Y-axis direction. In this case, the fixed side of the Y-axis encoder can be directly attached to the lower surface plate 18, thus not having the structure of being supported by an air bearing or the like with low X-axial rigidity and thus tending to vibrate, unlike the first moving unit 19 in the case of the X-axis. There thus occurs no problem of an encoder erroneously detecting vibrations and a servo device amplifying the vibrations.

Figure 5A:
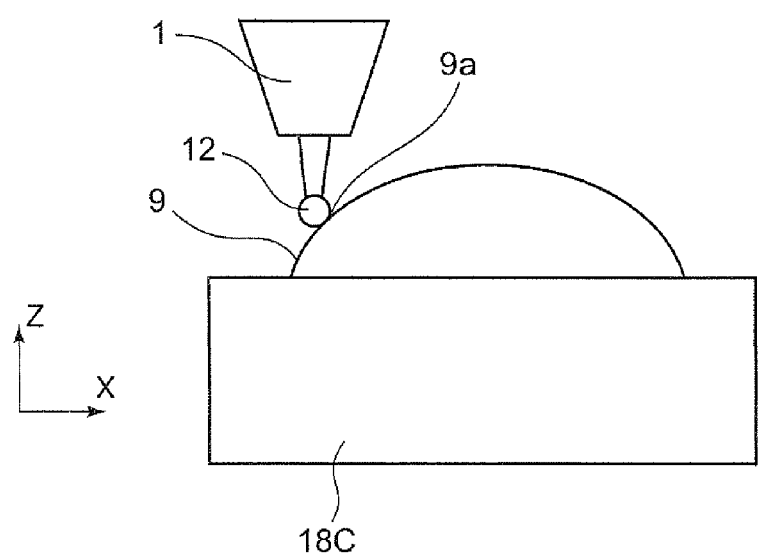
FIG. 5A is a view showing the relation of X- and Y-axial/Z-axial noises in the first embodiment of the present invention.

Hereinafter, an influence exerted by vibrations of the moving unit body section 19a on measurement data will be described with reference to FIGS. 5A and 5B.

It is assumed that vibration noise is generated in the X-axis direction in the moving unit body section 19a, and is then propagated to other portions due to resonance, and the vibrations due to the resonance are generated between the probe 1 and the X-axial laser emitting section 27 shown in FIG. 1, to cause generation of such vibrations, for example on the order of 25 nm, as to prevent the shape measuring apparatus from holding its rigidity (fixed shape), thus leading to deformation thereof. In such a case, an error on the order of 25 nm is generated in X-axial measurement.

As shown in FIG. 5B, in the case of measuring the inclined surface (an example of the measured surface) 9a of the measured object 9, assuming that an inclined angle is set to 45 degrees as one example, when vibration noise of 25 nm in the X-axis direction is outputted in a form where a shape error is represented by Zd and the difference Zd of (measurement data)−(design data) is plotted, the probe 1 measures the position of the inclined surface 9a of the measured object 9, and the X-axial measurement error is thus generated as the same amplitude in the Z-axis direction on the 45-degree inclined surface 9a. In this case, the problem is that the X-position is not correctly measured due to the X-axial vibrations, but data in the measured result is outputted as the form of being added with noise in the Z-axis direction.

Figure 6:
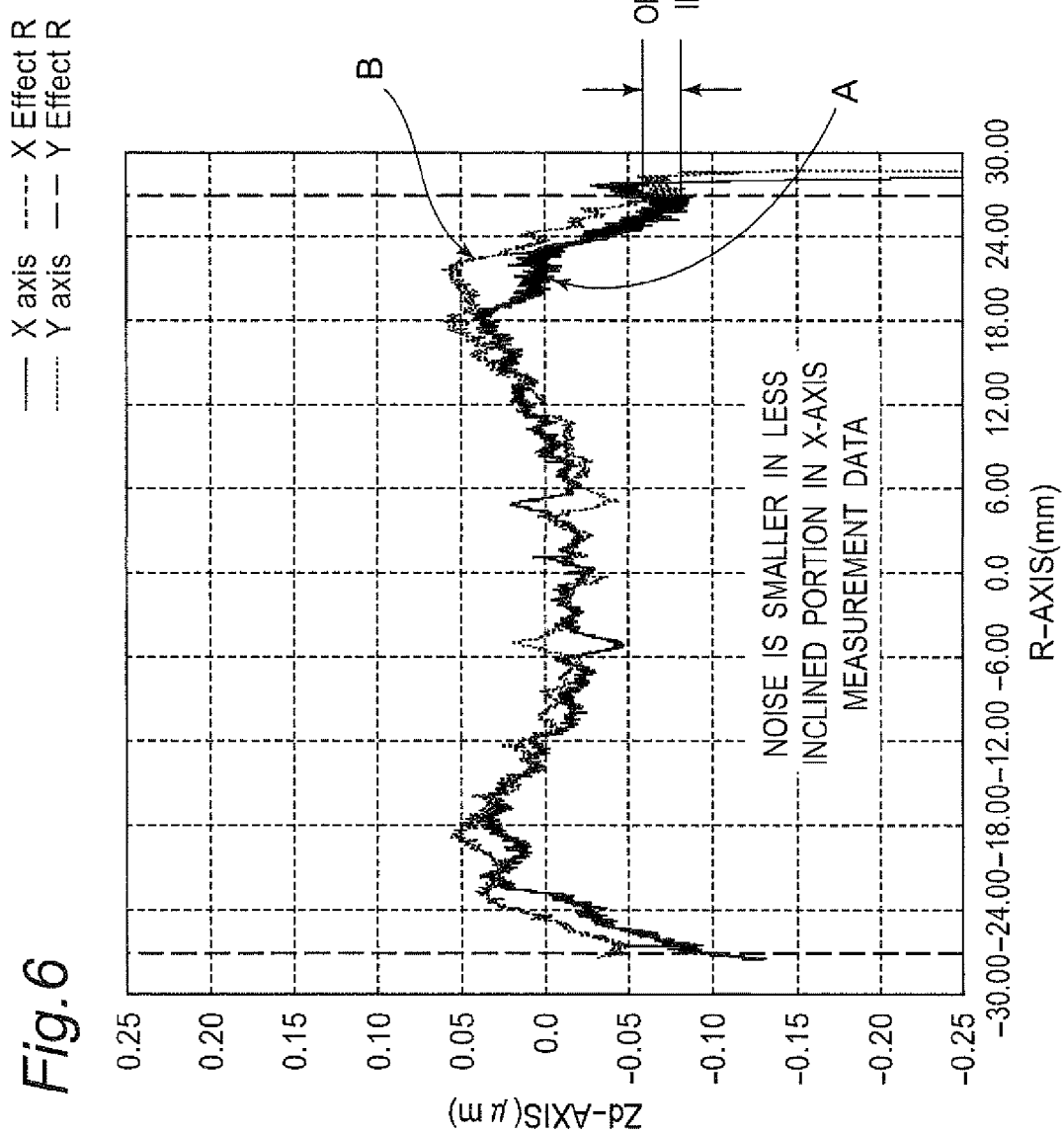
FIG. 6 is a view showing noise generated in measurement data in a conventional configuration.

In the conventional apparatus configuration, the first moving unit vibrates due to counteracting force of the X-axis linear motor, and the probe or the X-axial laser emitting section is resonated by the vibrations. This results in generation of noise in the X-axial measurement data. FIG. 6 explains an example of data in a state where this noise has been generated. In FIG. 6, a horizontal axis of the graph plots a radial position of a lens as an example of the measured object in the X or Y-axis direction (referred to as R-axis in FIG. 6), and a vertical axis plots the difference Zd of (measurement data)−(design data) in the Z-axis direction (referred to as Zd-axis in FIG. 6).

In FIG. 6, a solid line A is X-axial measurement data, and a dotted line B is Y-axial measurement data. Further, the lens shape of the measured object 9 in the present measurement data is configured such that the inclined angle of the measuring surface 9a of the measured object 9 increases from the center toward the outside in the XY-axis directions as shown in FIG. 5A. According to the measurement data of FIG. 6, the X-axial measurement data is added with a noise component with larger amplitude than the Y-axial measurement data in the peripheral portion of the lens, and a value as data of surface roughness of the X-axial surface is 25 nm which is larger than an actual value.

Figure 7:
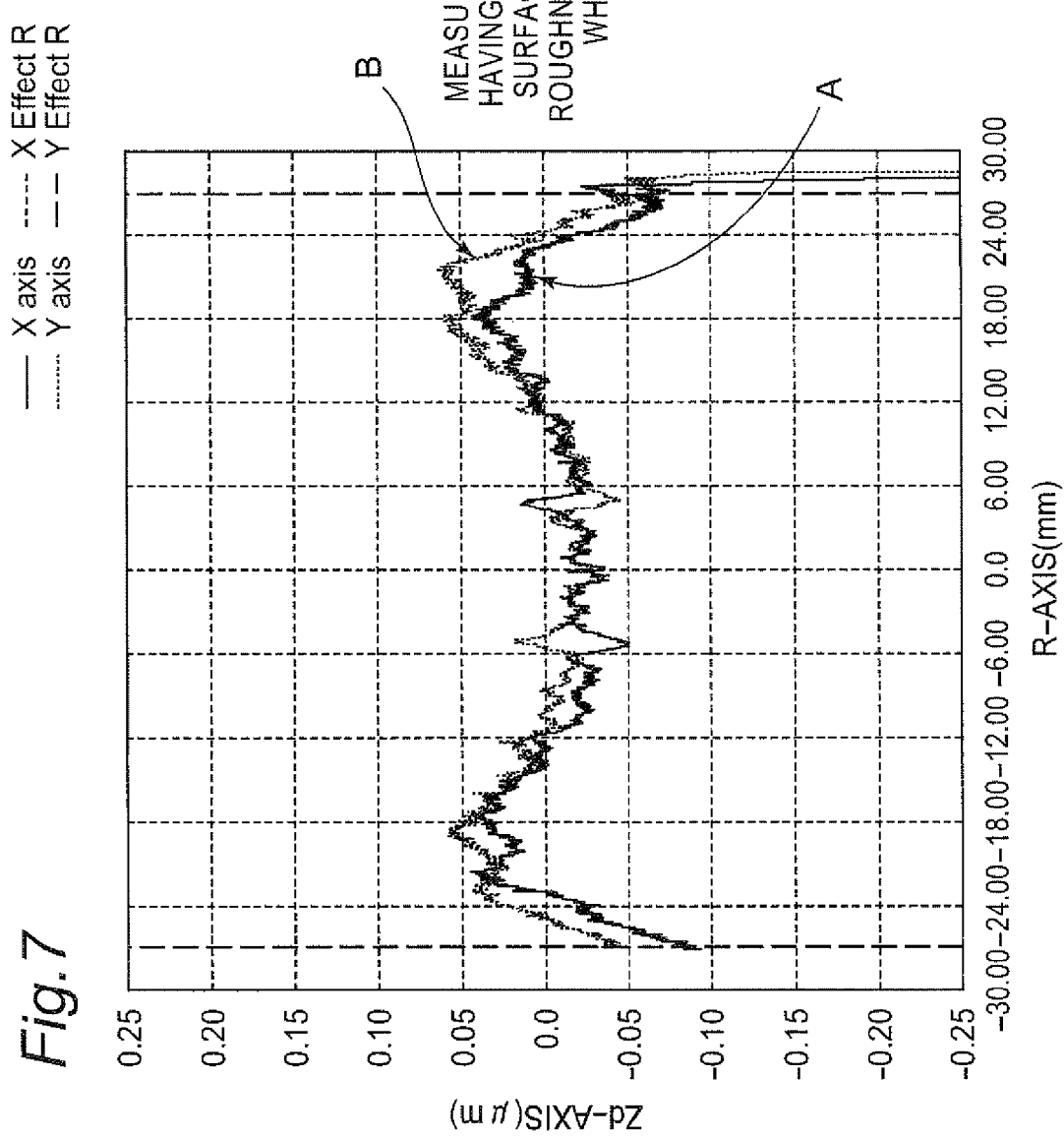
FIG. 7 is a view showing an example of measurement data measured by the first embodiment of the present invention.
Figure 8A:
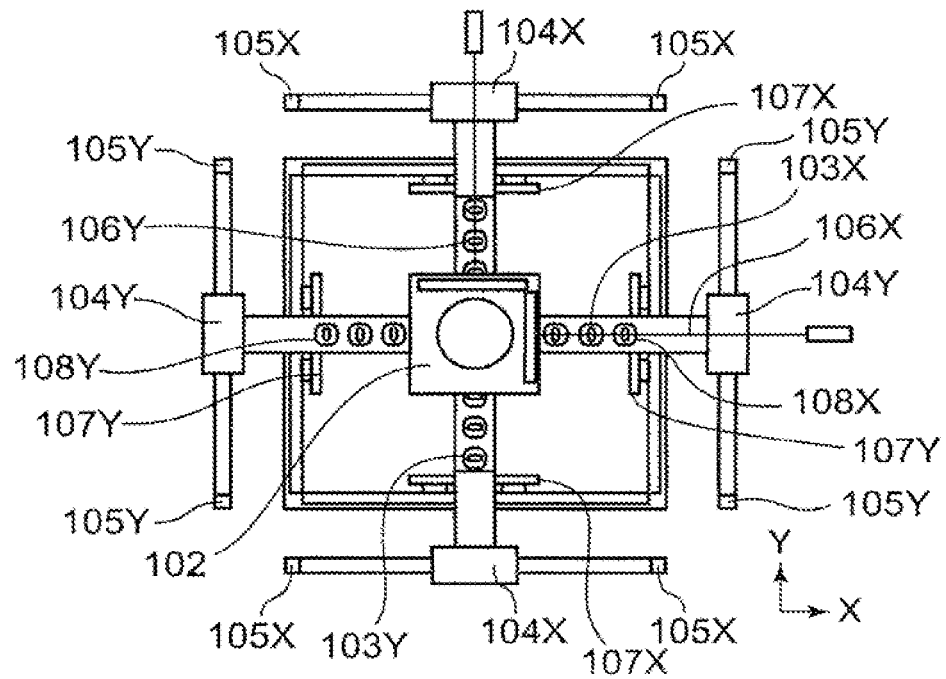
FIG. 8A is a plan view showing a stage configuration of a conventional shape measuring apparatus described in Japanese Unexamined Patent Publication No. 5-77126.
Figure 8B:
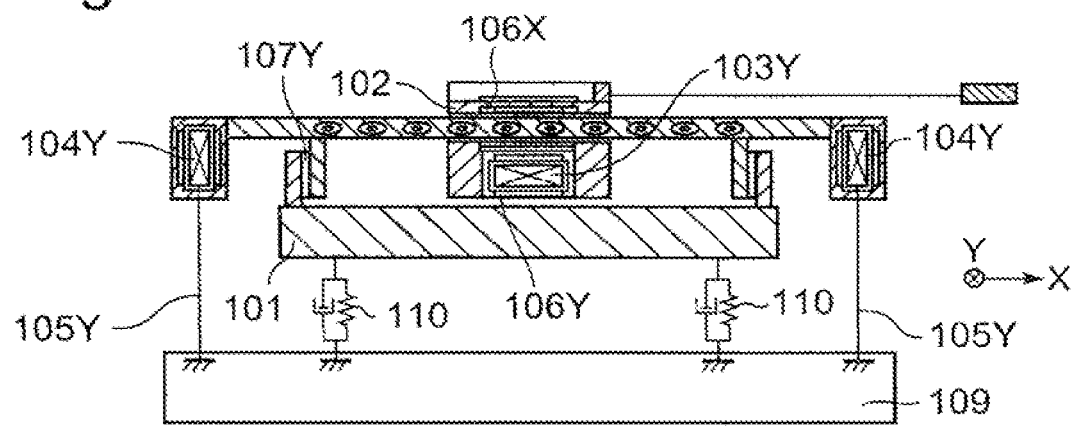
FIG. 8B is a side view showing the stage configuration of the conventional shape measuring apparatus described in Japanese Unexamined Patent Publication No. 5-77126.

As opposed to this, in the shape measuring apparatus 90 having the above-mentioned structure applied with the first embodiment of the present invention, the moving unit body section 19a does not vibrate, and as shown in FIG. 7, the X-axial measurement data is measured with roughness on the order of several nanometers similar to the Y-axis direction, thus enabling high-accuracy shape evaluation.

According to the configuration of the first embodiment as thus described, the counteraction of the driving force from the XY stage 3 at the time of driving the XY stage 3 by the X-axis linear motor 23 is received in the movement auxiliary unit 24 provided with the bearing (rolling bearing, etc.) having high rigidity against the X-axial force, from the lower surface plate 18 having a larger weight than that of the XY stage 3.

As a result, no counteraction is applied to the moving unit body section 19a having a smaller weight than that of the XY stage 3 which is movable in the Y-axis direction and required to precisely move in the Y-axis direction.

Further, due to the precise control of the axial movement, the moving unit body section 19a, which controls with high accuracy the moving direction in a non-contact manner by means of the air bearing 20 or the like and has low rigidity in the X-axis direction, does not vibrate, and excess vibrations are not applied to the position detecting device 26X such as the encoder, the position detecting device 26X detecting information for controlling the X-axial position and movement of the X-axis linear motor 23, so as not to cause increasing of vibrations of the moving unit body section 19a, thereby not leading to generation of vibrations harmful to the probe unit 14 through propagation due to resonance of the vibrations, whereby it is possible to perform high-accuracy measurement.

It is to be noted that the present invention is not restricted to the above embodiments, but can be carried on in other various aspects.

For example, in the present first embodiment, the measurement probe unit 14 is fixed to the XY stage 3 and the measured object 9 is mounted on the lower stone stage 18 via the holding section 18C. However, the present invention is not restricted thereto, and may be configured such that the measured object 9 is mounted on the XY stage 3 via the holding section 18C and the measurement probe unit 14 is fixed onto the lower stone stage 18.

Further, although it has been configured in the present first embodiment that the movement auxiliary unit is driven by the coupling mechanism 25, it may be configured that the movement auxiliary unit 24 is driven in synchronization with the moving unit body section 19a in a drive unit having a motor or the like different from the moving unit body section 19a.

It is to be noted that appropriately combining arbitrary embodiments or modified examples out of the above various embodiments or modified examples allows exertion of effects of the respective examples.

The shape measuring apparatus of the present invention is capable of reducing vibrations of the moving unit at the time of movement or positioning in the XY-axis directions, and is also applicable to a measurement device and the like which scan an image processing device such as a camera other than the probe as the surface detecting device, to control speed and capture data, and also applicable to the uses for measurement evaluation of high-accuracy devices such as optical components like a lens, a liquid crystal panel, a semiconductor, a medical instrumental component, and a micro-machine, where measurement and evaluation with nano-level high accuracy are required.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A shape measuring apparatus, comprising:
   a surface plate;
   a first moving unit that has a first fixed section extending along a first axis direction as any one of XY-axis directions of the surface plate and coupled with the surface plate, and a first movable section backward and forward moving along the first axis direction with respect to the first fixed section, and is arranged on the surface plate;
   a movement auxiliary unit that has an auxiliary unit fixed section extending along the first axis direction and coupled with the surface plate, and an auxiliary unit movable section backward and forward moving in substantially parallel with a moving direction of the first movable section with respect to the auxiliary unit fixed section; and
   a second moving unit that has a second fixed section which extends along a second-axis direction orthogonal to the first axis direction our of the XY-axis directions of the surface plate, and has one end movably supported by the first moving unit, and an other end fixed to the auxiliary unit movable section of the movement auxiliary unit, and a second movable section laterally moving in the second axis direction with respect to the second fixed section,
   wherein, the first moving unit has a first-axial drive unit having the first fixed section and the first movable section, while the second moving unit has a second axial driving unit having the second fixed section and the second movable section, and an XY-stage is configured such that the first-axial drive unit is driven to move the XY stage in the first-axis direction along with the first movable section with respect to the first fixed section,
   a counteraction of force generated at a time of movement of the second movable section is received in the movement auxiliary unit when the second axial drive unit is driven to move the XY stage in the second-axis direction along with the second movable section with respect to the second fixed section,
   one of a probe that measures a surface of a measured object and the measured object is supported by the XY stage, and the other is supported by the surface plate, and
   the XY stage is driven to relatively scan the probe in the XY-axis directions with respect to the surface of the measured object, to measure a shape of the measured object from information acquired by the probe.

2. The shape measuring apparatus according to claim 1, further comprising:
   a coupling mechanism that makes the auxiliary unit movable section of the movement auxiliary unit synchronized and move in accordance with movement of the first movable section of the first moving unit.

3. The shape measuring apparatus according to claim 1, further comprising:
   a position detecting device that detects a position of the second movable section of the second moving unit with respect to the first moving unit; and
   a position controlling section that drive-controls the second axial drive unit based on the position of the second movable section which is detected by the position detecting device.

4. The shape measuring apparatus according to claim 2, further comprising:
   a position detecting device that detects a position of the second movable section of the second moving unit with respect to the first moving unit; and
   a position controlling section that drive-controls the second axial drive unit based on the position of the second movable section which is detected by the position detecting device.

* * * * *